(No Model.)
A. RAMMOSER.
FASTENING FOR GLOVES OR CORSETS.
No. 387,009. Patented July 31, 1888.
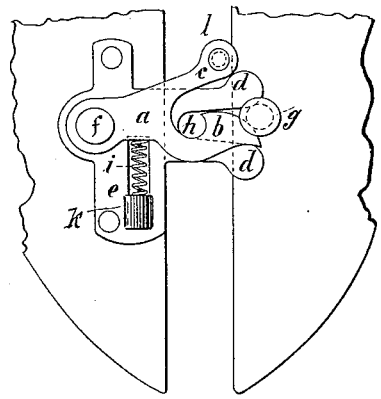
Fig. I.
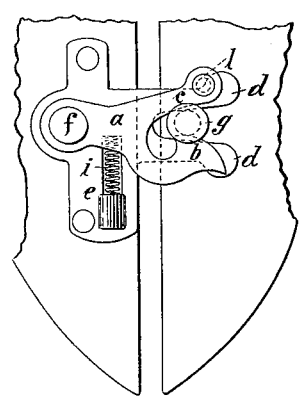
Fig. II.
Witnesses:
Wilhelm Schwiethal,
Albert Flöricke.
Inventor,
Albert Rammoser.
by Heuveraly,
atty

UNITED STATES PATENT OFFICE.

ALBERT RAMMOSER, OF BERLIN, GERMANY.

FASTENING FOR GLOVES OR CORSETS.

SPECIFICATION forming part of Letters Patent No. 387,009, dated July 31, 1888.

Application filed August 8, 1887. Serial No. 246,476. (No model.) Patented in England May 27, 1887, No. 7,759, and in Belgium June 20, 1887, No. 77,665.

*To all whom it may concern:*

Be it known that I, ALBERT RAMMOSER, engineer, of Berlin, in the Kingdom of Prussia and German Empire, have invented a new and useful Improvement in Fastenings for Gloves, Trunks, Corsets, and other Like Purposes, of which the following is a specification, reference being had therein to the accompanying drawings, (no patents being obtained by me anywhere for this invention save in Belgium, No. 77,665, dated June 20, 1887, and in England, No. 7,759, dated May 27, 1887.)

My invention relates to improvements in fastenings for gloves, trunks, corsets, and other like purposes.

This improved fastening is so arranged that upon pushing together or shutting up an automatic fastening is effected, while the work of opening is easily done by pushing back the fastening-hook, though no automatic opening of the fastening is possible.

Figures 1 and 2 show a single fastening.

The fastening, Figs. 1 and 2, consists of the hook part $a$, forked plate or part $e$, with forks $d\ d$, and the fastening-stud $g$. The hook part $a$ rests at $f$ on the plate $e$, and can turn round, and is continuously pressed upon by the spiral spring $i$, which lies at $k$ in the cage or guide on the plate $e$. The hook $b$ closes up the space between the forks $d\ d$ with the exception of an aperture of suitable size, $h$, Fig. 1. Into this aperture the stud $g$ enters, being introduced between the ends of the forks $d\ d$. When sliding along the hook-surface $b$, it is pressed into the hook part $a$ until the stud $g$ is caught in the aperture $h$ by the shoulder forming the hook $b$.

In opening the fastening the hook is pressed back by means of the pin $l$ on the arm or fork $c$ of plate $a$, so that the stud $g$ is released and can pass out from the forks $d\ d$.

What I claim, and desire to secure by Letters Patent of the United States, is—

The improved construction of fastenings for gloves, trunks, corsets, and other like purposes, consisting of the part $a$, turning on the pin or axis $f$, with the hook $b$ thereon, which, by means of the spring $i$, is kept closed across the forks $d\ d$, and catches and retains the stud $g$, all substantially in the manner and for the purposes hereinbefore described.

In witness whereof I have hereunto set my hand in presence of two witnesses.

ALBERT RAMMOSER.

Witnesses:
  B. ROI,
  FRIEDRICH SCHRÄDER.